United States Patent
Huang

(10) Patent No.: US 7,698,399 B2
(45) Date of Patent: Apr. 13, 2010

(54) ADVANCED IPMI SYSTEM WITH MULTI-MESSAGE PROCESSING AND CONFIGURABLE PERFORMANCE AND METHOD FOR THE SAME

(75) Inventor: Shih-Yuan Huang, Keelung (TW)

(73) Assignee: ATEN International Co., Ltd., Shijr (TW)

(*) Notice: Subject to any disclaimer, the term of this patent is extended or adjusted under 35 U.S.C. 154(b) by 1168 days.

(21) Appl. No.: 10/711,342

(22) Filed: Sep. 13, 2004

(65) Prior Publication Data

US 2005/0267956 A1    Dec. 1, 2005

(30) Foreign Application Priority Data

May 31, 2004   (TW) .............................. 93115492 A

(51) Int. Cl.
G06F 15/173    (2006.01)
(52) U.S. Cl. .................................................. 709/223
(58) Field of Classification Search ................. 709/223
See application file for complete search history.

(56) References Cited

U.S. PATENT DOCUMENTS

| 2002/0010804 A1* | 1/2002 | Sanghvi et al. ............. 709/318 |
| 2003/0033464 A1* | 2/2003 | Larson et al. ............... 710/302 |
| 2003/0063618 A1* | 4/2003 | Khacherian et al. ......... 370/413 |
| 2003/0213868 A1* | 11/2003 | Brunner et al. ............. 244/3.16 |
| 2004/0148385 A1* | 7/2004 | Srinivasan et al. .......... 709/224 |
| 2005/0114549 A1* | 5/2005 | Durham et al. ............. 709/246 |
| 2005/0229173 A1* | 10/2005 | Mihm et al. ................ 717/171 |

OTHER PUBLICATIONS

IPMI, "Intelligent Platform Management Interface Specification", v1.5, Document Revision 1.1, Intel, Hewlett-Packard, NEC, Dell—Feb. 20, 2002.*
IPMI, "Intelligent Platform Management Bus Communications Protocol Specification", v1.0, Document Revision 1.0, Intel, Hewlett-Packard, NEC, Dell—Nov. 15, 1999.*

* cited by examiner

*Primary Examiner*—Vivek Srivastava
*Assistant Examiner*—William J Goodchild
(74) *Attorney, Agent, or Firm*—Chen Yoshimura LLP

(57) ABSTRACT

An advanced IPMI system with multi-message processing and configurable performance and method for the same, optimally used among message sources, i.e. a host system and/or an operating terminal, to process IPMI messages from said message source is disclosed. The IPMI system includes an IPMI message subsystem, an IPMI core subsystem, and a central message buffer unit. The central message buffer unit provides a pointer to a corresponding address for temporary storage of each IPMI message. Each said subsystem each time just transmits the pointer, without a copy of the IPMI message, when transmittal of IPMI message is needed, for reducing times of reading IPMI message. The IPMI message subsystem utilizes multiple programmable-configured message processing units to concurrently multi-process lots of IPMI messages, in compliance with modular design of most units of said subsystems, for raising the implementing performance of the IPMI system.

6 Claims, 4 Drawing Sheets

ADVANCED IPMI SYSTEM WITH MULTI-MESSAGE PROCESSING AND CONFIGURABLE PERFORMANCE AND METHOD FOR THE SAME

BACKGROUND OF INVENTION

1. Field of the Invention

The invention relates to an advanced IPMI system with multi-message processing and configurable performance and method for the same, and more particularly, to an IPMI system and method for the same for server management.

2. Description of the Prior Art

As known in the art, when remote servers, such as telecommunications equipment, computer stations, and especially ISP servers are out of order, a system manager must go to the server's location to fix the breakdown. This requires a lot of manpower and time. To solve this issue, management technology for remote servers, such as an intelligent platform management interface (IPMI), has gradually been developed.

The IPMI mainly comprises a hardware structure, i.e., a micro-controller having a baseboard management controller (BMC) and firmware embedded in the BMC. The IPMI is actually a server management subsystem operating independently from server hardware such as the central process unit (CPU), basic input/output system (BIOS), and software such as the operating system (OS) and system management software (SMS). The IPMI controls the system management software and the interface of the platform management hardware, especially when failure of the CPU, the BIOS, and/or the OS of the server occurs.

Most of the BMC micro-controllers of the IPMI integrate with an A/D converter for monitoring voltage, a fan speed counter, and an IO and a bus for a sensor. As a watchdog timer of the IPMI detects a fault of the CPU, BIOS, OS, or application program of the servers, the IPMI provides a platform event filter (PEF) to correct a fault or follow instructions from the operating terminal on fault correction. Moreover, the IPMI automatically provides system status detection of software/hardware of the servers, an event diary log, system rebooting control, automatic alarm for the event, and auto-system control (such as system power off). For example, the BMC micro-controller of the IPMI utilizes an $I^2C$ digital sensor to obtain by polling the measurement of the host system to monitor the system voltage, temperature, and fan speed variations of the remote host system. The IPMI then decides whether the monitored data exceed the default range and sends an $I^2C$ sensing data (an IPMI message) through an intelligent platform management bus (IPMB) or communicates with the host system through a system management bus (SMBus) interface. Any system exception will be immediately recorded in a system event log (SEL) and the IPMI will call for the PEF to find a response action that matches the exception, for instance, cutting off the power supply, re-plugging in the power, rebooting, sending/broadcasting a warning, and so forth.

The IPMI can further allow a remote operating terminal for transmitting through a local area network (LAN) an IPMI message packet conforming to remote mail checking protocol (RMCP) and user datagram protocol/internet protocol (UDP/IP) or remotely monitoring/controlling servers with serial messages of serial modem (such as a universal asynchronous receiver/transmitter, UART) interface protocol for accessing the monitored data for immediate fault correction to a critical event. When the temperature of said server over-ranges significantly, the IPMI keeps track of the event log for future reference and automatically exterminates the problem by speeding up the system fan for more heat dissipation and sending a broadcast caution on local area network (LAN), that is, sending to the remote operating terminal a simple network management protocol (SNMP) trap of platform event traps (PET) or a caution of a serial modem. The operating terminal, host system, or BMC controller of the IPMI receives/sends an IPMI channel message for the firmware of the IPMI to process and respond through some different fixed channels, such as intelligent platform management bus (IPMB), keyboard control style application interface (KCS), intelligent chassis management bus (ICMB), universal asynchronous receiver/transmitter (UART), or local area network (LAN).

What needs to be noticed is that the IPMI system cannot directly access hardware data of a sensor unit such as an $I^2C$ sensor but accesses said data by generating a sensor command such as 'Get Sensor Reading' through a sensor management unit such as a management controller.

However, firmware design of the generic IPMI is still not perfect and some drawbacks exist:

(1) As an IPMI massage passes through a module or a unit of the firmware, the module or unit itself needs to allocate a dedicated local memory to copy the passing IPMI message for later passing, queuing, using, and implementing the IPMI message. This requires higher memory cost and lowers the IPMI performance since reading/copying the IPMI message occurs in all steps, increasing the overall system execution time.

(2) The execution unit of the prior art IPMI firmware deals with one IPMI message at a time and the rest of the IPMI messages wait in queue for the next response, dropping even more IPMI performance.

(3) Because of the interdependence of the prior art IPMI firmware units, replacement of any individual unit is unlikely, especially when the operator needs some changes of the firmware functions. Nothing can be changed unless rearranging the overall IPMI structure; therefore, no expandability and programmability is allowed to the user.

(4) The prior art IPMI firmware requires a sensor management unit such as a management controller to access a sensing event in an electrically erasable programmable read only memory (EEPROM) of a sensor unit. However, the access speed of the EEPROM is pretty low. The EERPOM will be busy and then jammed in the data bus if lots of IPMI messages are in queue. Especially when the EEPROM shares the data bus with other devices, lots of data collisions will make the system even more sluggish.

(5) The prior art IPMI firmware is unable to automatically coordinate with too many different types of hardware such as BMC controllers or different types of operating systems (OSs).

SUMMARY OF INVENTION

It is therefore a primary objective of the claimed invention to provide an advanced intelligent platform management interface (IPMI) system and method for the same to solve the above-mentioned problems to provide the IPMI system with multi-message processing and configurable performance.

According to the claimed invention, the advanced IPMI system and method for the same include a central message buffer unit for providing a pointer to a corresponding address for temporary storage of each IPMI message. Therefore, any unit or module in the IPMI system transmits or puts in queue the pointer to the corresponding address of the IPMI message rather than the IPMI message itself. The IPMI message is accessed in the central message buffer unit by the pointer when the IPMI message is needed for use or execution. Thus, the method lowers memory usage and cost and reduces execution time since only a tiny-sized pointer is used in any transmission/queuing process. The overall IPMI performance is improved.

Another objective of the claimed invention is to provide an advanced IPMI system with multi-message processing and configurable performance and method for the same, using a plurality of programmable-configured message processing units for concurrently multi-processing the IPMI messages and further improving the IPMI performance.

Another objective of the claimed invention is to provide an advanced IPMI system with multi-message processing and configurable performance and method for the same that presents most functions in sheet form so that a user predetermines needed parameters. Modularization of the procedures to execute the IPMI messages enhances the expandability and configurability of the system given some user's need of additions and deletions of the functions without reprogramming the whole system.

Another objective of the claimed invention is to provide an advanced IPMI system with multi-message processing and configurable performance and method for the same that utilizes a memory control unit to regularly poll a new sensing event in the electrically erasable programmable read only memory (EEPROM) of the sensor unit allowing a cache unit to access and store the sensing event. The cache unit includes a random access memory (RAM) which allows far faster accessing than EEPROM does, remarkably speeding up the reading of the sensing event from the cache unit by the memory control unit.

Another objective of the claimed invention is to provide an advanced IPMI system with multi-message processing and configurable performance and method for the same that uses a operating system (OS) management module and a hardware management module for communications between the IPMI system and different OSs and BMCs, allowing the IPMI system to function in different hardware environments.

To achieve the previous objectives, the claimed invention provides an advanced IPMI system, optimally used among message sources, i.e. a host system and/or an operating terminal. The IPMI system includes an IPMI message subsystem, an IPMI core subsystem, and a central message buffer unit. Meanwhile, the central message buffer unit, having a memory block, provides a pointer to a corresponding address for temporary storage of each IPMI message. Each said subsystem just transmits the pointer for reducing times of reading the IPMI message. Said IPMI message subsystem further includes a channel center, a message collection unit, and a message execution group. A plurality of channel application interfaces are included in the channel center for receiving/sending a corresponding IPMI message from the message sources, storing the IPMI message in said central message buffer unit, and providing a pointer to a corresponding address of the IPMI message. At least one channel application interface correspondingly connects to a programmable-configured sheet for user definition and provides the function of modular switch and renewal.

The message collection module collects in queue the pointers transmitted by each channel application interface and transmits the pointers to the message execution group.

The message execution group further includes a plurality of programmable-configured message service modules, a programmable-configured message sheet, and at least a message processing unit. The message service module designates every IPMI message a default execution procedure correspondingly. The message sheet allows the user to define the corresponding relation between every IPMI message and said message service module. The plurality of programmable-configured message processing units allow the user to concurrently multi-process the IPMI messages and the message processing units receive the pointer transmitted by said message collection unit, look up the corresponding message service module of the message sheet according to every IPMI message, and initiate the execution procedure of the message service module. The message processing units of the message execution group additionally transmit the pointers to said IPMI core subsystem through the message service modules.

The IPMI core subsystem includes a plurality of application units wherein according to the direction of an execution procedure of said IPMI message subsystem, at least one application unit reads and processes the IPMI message from said central message buffer unit according to the pointer. The application units of the IPMI core subsystem generate a response message after the execution of said IPMI message and generate a response pointer to a corresponding address for temporary storage of the response message in the central message buffer unit.

Then, the IPMI core subsystem transmits the response pointer back to the message execution group for releasing the allocated address of said IPMI message in the central message buffer unit. Next, the response pointer is transmitted to the original channel application interface, allowing the channel application interface to read a corresponding response message from the central message buffer unit and send it back to the message sources.

The claimed invention IPMI system further includes an operating system (OS) management module having multiple specific mapping functions for communicating with different types of OS allowing the advanced IPMI system to function with different OSs, and a hardware management module having a plurality of driver units for communicating with different baseboard management controllers (BMC) allowing the advanced IPMI system to function in different hardware environments.

The application units of the claimed invention IPMI core subsystem further include an $I^2C$ sensor having an electrically erasable programmable read only memory (EEPROM) for storing a sensing event of a physical change in a host system, a cache unit (a random access memory, RAM) for accessing and storing said sensing event from the EEPROM of the $I^2C$ sensor, a memory control unit for regularly polling a new sensing event in the EEPROM of the $I^2C$ sensor allowing the cache unit to access and store the sensing event, a plurality of $I^2C$ drivers for driving different $I^2C$ sensors, and an $I^2C$ driver management unit for managing said plurality of $I^2C$ drivers with an application interface.

In addition, the claimed invention further provides a method for an advanced intelligent platform management interface (IPMI) system with multi-message and configurable performance, optimally used among message sources, the method includes:

at least one channel application interface receiving at least one IPMI message from the message sources;

the channel application interface verifying the received IPMI message;

storing temporarily every said IPMI message in a central message buffer unit and providing a pointer to the corresponding address;

collecting in queue all pointers of the IPMI message by a message collection unit and transmitting the pointers to the message execution group;

multi-processing concurrently the IPMI messages by a plurality of programmable-configured message processing units of said message execution group, the message processing unit looking up the corresponding message service module of a programmable-configured message sheet according to the IPMI message and initiating the execution procedure of the message service module, the application unit executing the IPMI message according to the execution procedure of the message service module;

the message processing units transmitting the pointers to the IPMI message through the message service modules to the application units for processing;

from the direction of said execution procedure, the application units reading, and processing the IPMI message from the central message buffer unit according to the pointer;

generating a response message after the execution by the application units and generating a response pointer to a corresponding address for temporary storage of the response message in the central message buffer unit;

transmitting the response pointer from the application units to the message execution group for execution;

the message processing unit of the message execution group releasing the allocated address of said IPMI message in the central message buffer unit according to the response pointer;

sending back the response message to message sources by said channel application interface ordered by the message execution group; and releasing allocation of the address of the response message in the central message buffer unit by said channel application interface.

The method for the claimed invention advanced IPMI system further includes:

storing by a sensor unit a sensing event of a physical change in a host system in an electrically erasable programmable read only memory (EEPROM);

polling regularly by a memory control unit a new sensing event in the EEPROM of the sensor unit;

controlling a cache unit for accessing and storing a new sensing event of the EEPROM of the sensor unit; and the memory control unit reading the sensing event from the cache unit according to the request of message sources.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
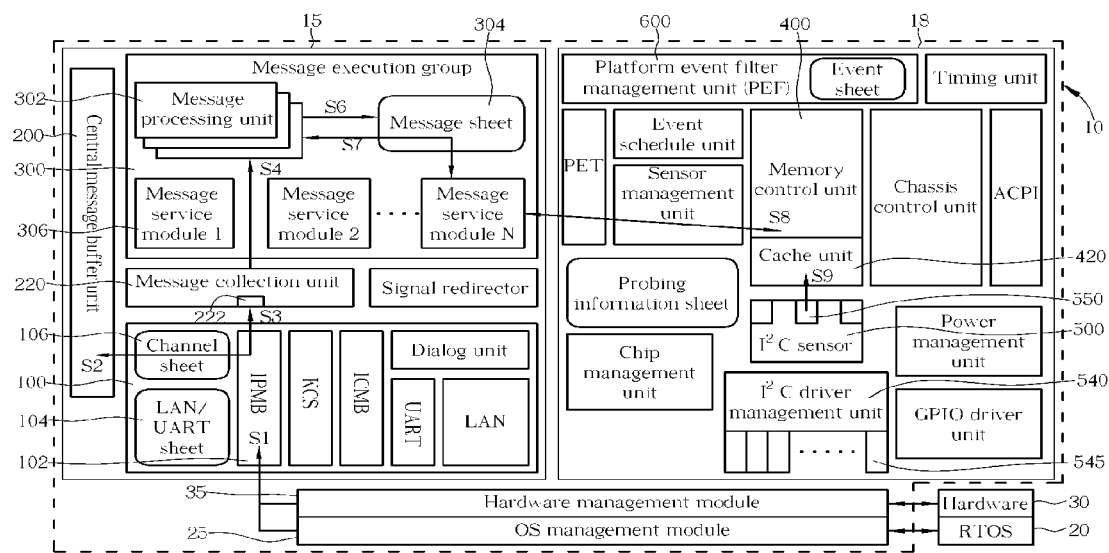
FIG. 1 illustrates a composition structure diagram describing an internal structure of an advanced IPMI system as the preferred embodiment.

FIG. 1 shows the main structure of an exemplary embodiment of a present invention advanced intelligent platform management interface (IPMI) system 10, optimally used among message sources, i.e. a host system and an operating terminal (not shown). The IPMI system 10 comprises an IPMI message subsystem 15, an IPMI core subsystem 18, and a central message buffer unit 200. The central message buffer unit 200 includes a memory block for storing temporarily each IPMI message sent by said message sources and providing a pointer to a corresponding address. The pointer is taken for transmission by said subsystems to reduce times of reading IPMI message by said subsystems, raising the performance of the advanced IPMI system 10.

The IPMI message subsystem 15 further comprises a channel center 100, a message collection unit 220, and a message execution group 300. The channel center 100 has a plurality of channel application interfaces 102 and programmable-configured sheets 104, 106. The plurality of channel application interfaces 102 at least includes an intelligent platform management bus (IPMB) application interface, a keyboard control style application interface (KCS), an intelligent chassis management bus (ICMB) application interface, a universal asynchronous receiver/transmitter (UART) application interface, and a local area network (LAN) application interface. Each channel application interface 102 stands for a specific channel application program interface (API). For example, the IPMI application interface works for receiving from/sending to said message sources a corresponding IPMI message (such as step S1 in FIG. 1). When verifying the received IPMI message, the said channel application interface 102 then stores the IPMI message in the central message buffer unit 200 (such as step S2 in FIG. 1), provides a pointer to the corresponding address, and transmits the pointer to the message collection unit 220 (such as step S3 in FIG. 1). The programmable-configured sheets such as channel sheet 106 and LAN/UART sheet 104 connect respectively with said channel application interfaces 102 for user definition, providing the function of modular switch and renewal. LAN/UART sheet 104 maintains the regulation of the username and password from those who communicate through UART and LAN application interfaces.

Figure 4:
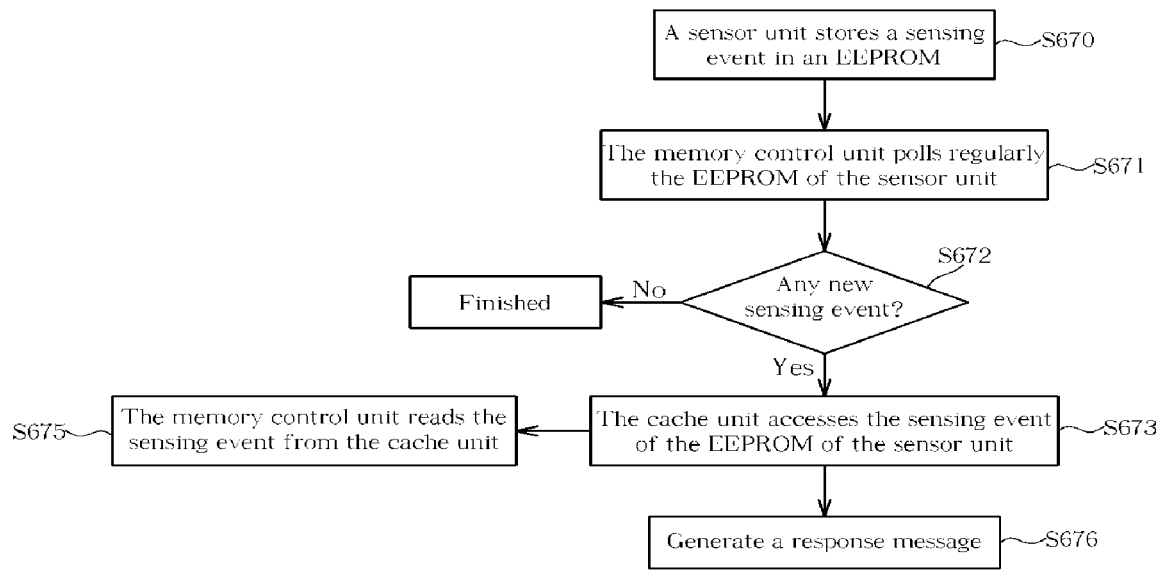
FIG. 4 illustrates a flowchart describing an execution method of an IPMI system as the preferred embodiment that further reveals the execution procedure of an IPMI message by a memory control unit.

The message collection unit 220 has a queue 222 to collect in queue the pointers transmitted by said channel application interfaces 102 and forwards them to said message execution group 300 (such as step S4 in FIG. 4).

The message execution group 300 further comprises a plurality of programmable-configured message processing units 302, a programmable-configured message sheet 304, and a plurality of message service modules 306. Each message service module 306 designates correspondingly every IPMI message a default execution procedure, i.e. a routine. The message sheet 304 allows the user to predefine a corresponding relation between every IPMI message and said message service module 306. The plurality of programmable-configured message processing units 302, i.e. threads, can be preconfigured and installed by user's need to concurrently multi-process the IPMI messages, looks up the corresponding message service module 306 of the message sheet 304 according to every IPMI message (such as step S6 in FIG. 1) and initiates the execution procedure of the message service module 306 (such as step S7 in FIG. 1).

As FIG. 1 shows, the IPMI core subsystem 18 includes a plurality of application units such as a simple network management protocol (SNMP) trap, an event daemon, a sensor manager, a chassis controller, a platform event filter management unit (PEF), a chip management unit, an advanced configuration and power interface (ACPI), an $I^2C$ driver management unit, a basic general purpose input/output (GPIO), and a power manager. Each application unit equips the IPMI system 10 with a specific function, e.g., the memory control unit 400 accesses the memory. When an application unit of the IPMI core subsystem 18 receives the direction of the execution procedure of the IPMI message subsystem 15, the application unit executes said IPMI message. Meanwhile, the message processing unit 302 of the message execution group 300 transmits the IPMI message pointer to the application units (such as the memory control unit 400) of said IPMI core subsystem 18 for execution through the message service modules 306 (such as step S8 in FIG. 1). Then the application unit reads and processes the IPMI message from the central message buffer unit 200 according to the pointer, generates a response message after the execution of said IPMI message, and then generates a response pointer to a corresponding address for temporary storage of the response message in the central message buffer unit 200.

The IPMI core subsystem 18 transmits the response pointer back to the original message processing unit 302 of the message execution group 300 of the IPMI message subsystem 15 for releasing the allocated address of said IPMI message in the central message buffer unit 200, and next transmits the response pointer to the original channel application interface 102, such as IPMB application interface, allowing the channel application interface 102 to read a corresponding response message from the central message buffer unit 200 and send it back to the message sources.

The claimed advanced IPMI system 10 further comprises an operating system (OS) management module 25 having multiple specific mapping functions for communicating with different types of real time operating system (RTOS) 20 allowing the advanced IPMI system 10 to function with different OS, and a hardware management module 35 having a plurality of driver units for communicating with different hardware 10 such as baseboard management controllers (BMC) allowing the advanced IPMI system 10 to function in different hardware environments.

Moreover, the application units of an exemplary embodiment of the claimed invention IPMI core subsystem 18 further comprise an I²C sensor 500 having an electrically erasable programmable read only memory (EEPROM) 550 for storing a sensing event of a physical change in a host system, a cache unit 420 (such as a random access memory, RAM) for accessing and storing said sensing event from the EEPROM 550 of the I²C sensor 500, a memory control unit 400 for regularly polling a new sensing event in the EEPROM 550 of the I²C sensor 500 allowing the cache unit 420 to access and store the sensing event, a plurality of I²C drivers 545 for driving different I²C sensors 500, and an I²C driver management unit 540 for managing said plurality of I²C drivers 545 with an application interface.

Figure 2:
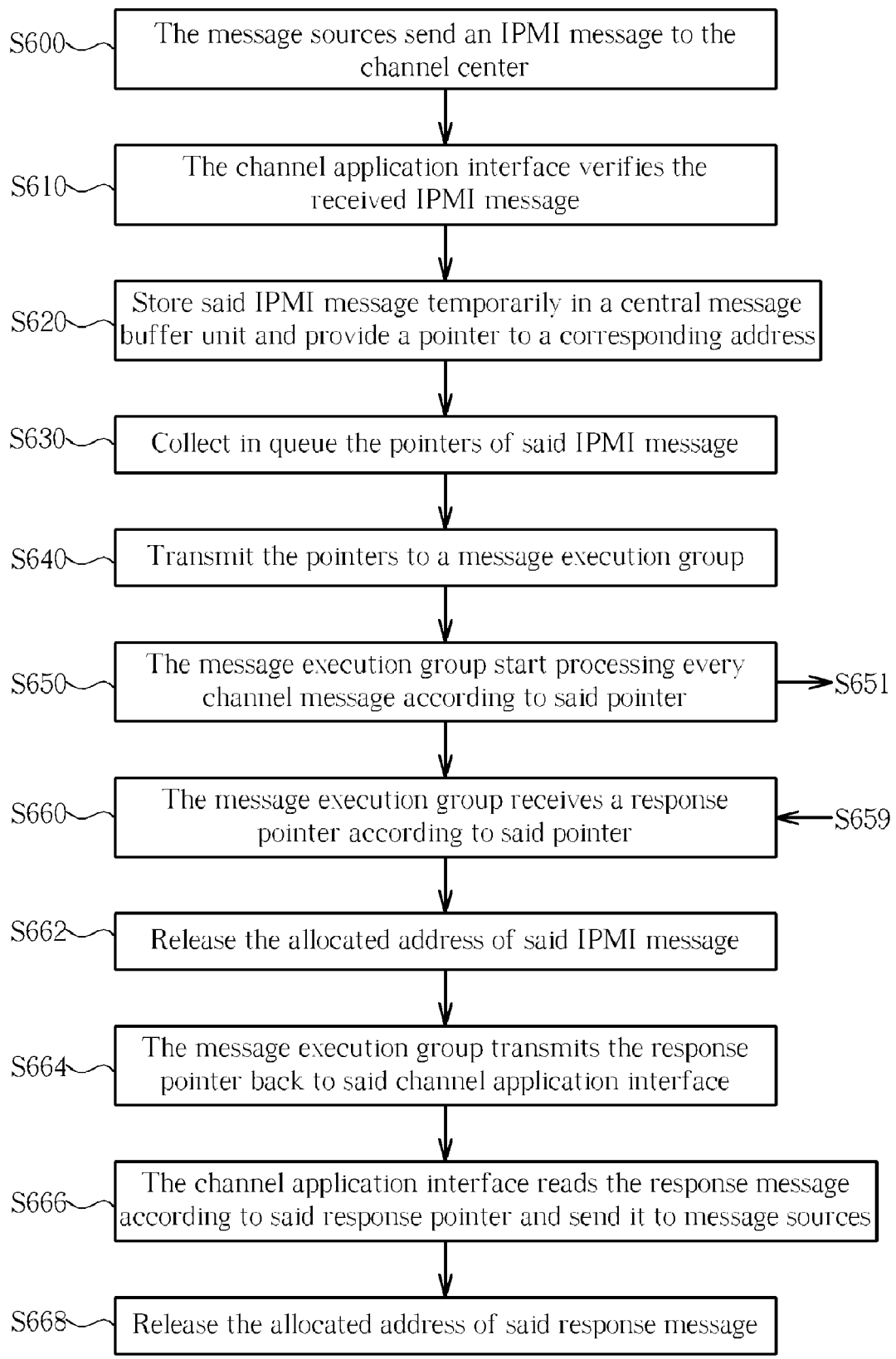
FIG. 2 illustrates a flowchart describing an execution method of an IPMI system as the preferred embodiment.

As FIG. 2 shows, the method of the exemplary embodiment of an advanced IPMI system with multi-message processing and configurable performance, optimally used among message sources, comprises:

Step S600: As the message source sends an IPMI message to the channel center 100, let at least a corresponding channel application interface 102 (such as the IPMB application interface) receive the IPMI message.

Step S610: The channel application interface 102 verifies the received IPMI message.

Step S620: Store said IPMI message temporarily in a central message buffer unit 200 and provide a pointer to the corresponding address stored IPMI message.

Steps S630, S640: Collect in queue the pointers of said IPMI messages by a message collection unit 220 and transmit the pointers to the message execution group 300.

Step S650: The message execution group 300 starts processing every channel message according to said pointer.

Figure 3:
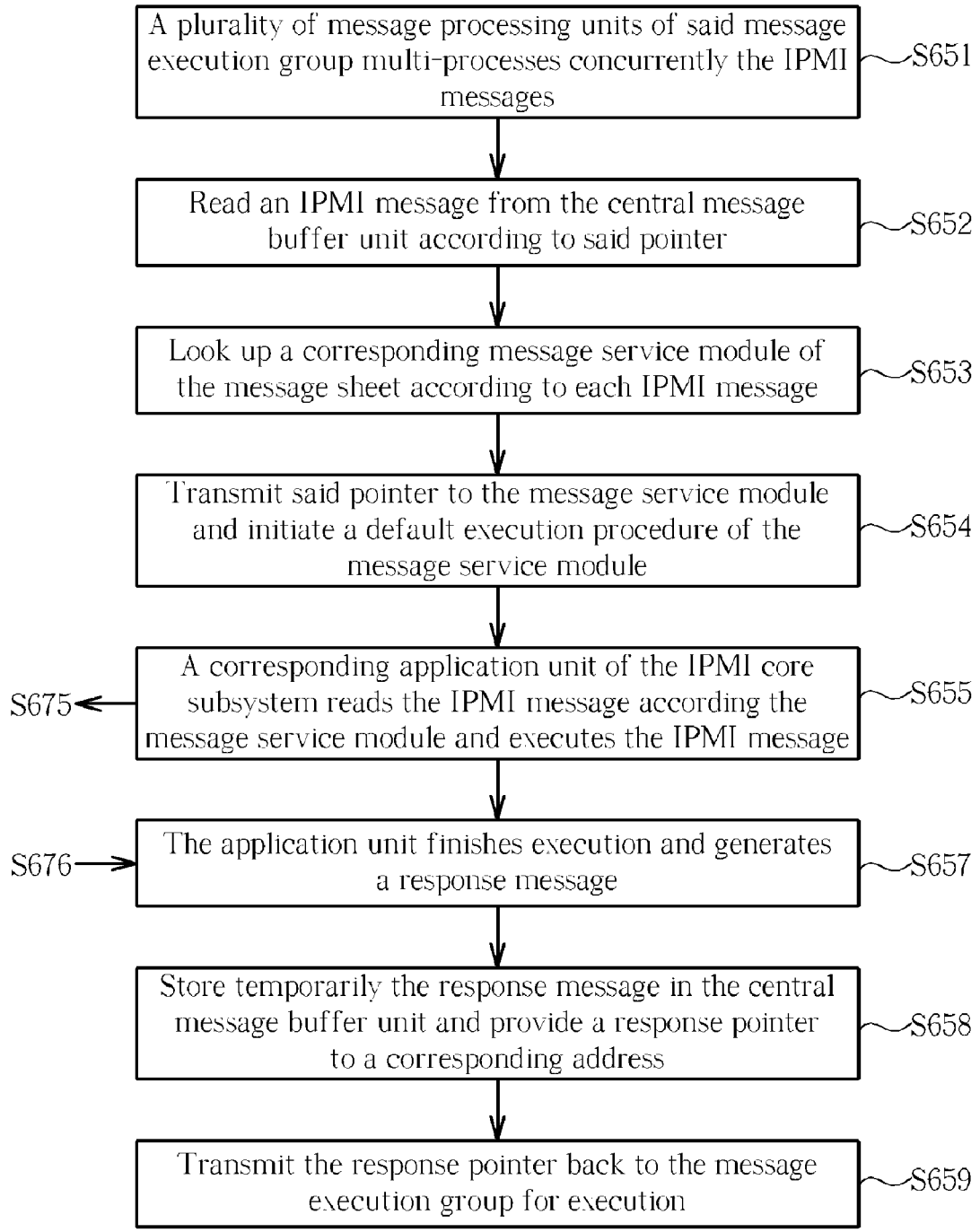
FIG. 3 illustrates a flowchart describing an execution method of an IPMI system as the preferred embodiment that further reveals detailed information of the execution of an IPMI message between an IPMI message subsystem and an IPMI core subsystem.

Next please see the step S651 in FIG. 3.

Step S651: A plurality of programmable-configured message processing units 302 of said message execution group 300 multi-processes concurrently the IPMI messages.

Step S652: Each message processing unit 302 reads an IPMI message from the central message buffer unit 200 according to said pointer.

Step S653: According to each IPMI message, the message processing unit 302 looks up a corresponding message service module 306 of a programmable-configured message sheet 304.

Step S654: The message processing unit 302 transmits said pointer to the message service module 306 and initiates a default execution procedure of the message service module 306.

Step S655: When executing the execution procedure of the message service module 306, the message processing unit 302 transmits the pointer to an application unit through said message service module 306 and instructs the application unit for reading according to the pointer the IPMI message from the central message buffer unit 200 and executing the IPMI message.

Step S657: The application unit finishes execution and generates a response message.

Step S658: Store temporarily the response message in the central message buffer unit 200 and provide a response pointer to the corresponding address of the stored response message.

Step S659: The application unit transmits the response pointer back to the message processing unit 302 of the message execution group 300 for execution.

Then please turn back to steps S660 and S662 in FIG. 2.

Steps S660, S662: The message processing unit 302 of the message execution group 300 receives the response pointer and releases the allocated address of said IPMI message in the central message buffer unit 200 according to said pointer.

Step S664: The message processing unit 302 of the message execution group 300 transmits the response pointer back to said channel application interface 102.

Step S666: Let said channel application interface 102 read the response message according to said response pointer and send it to message sources.

Step S668: The channel application interface 102 releases the allocated address of said response message in the central message buffer unit 200.

As FIG. 4 shows, a preferred embodiment of the method of the claimed invention advanced IPMI system further comprises an application unit (such as memory control unit 400) executing the IPMI message in detail, which includes:

Step S670: Store by a sensor unit 500 a sensing event of a physical change in a host system in an electrically erasable programmable read only memory (EEPROM) 550.

Step S671: Poll regularly by a memory control unit 400 a new sensing event in the EEPROM 550 of the sensor unit 500;

Step S672, S673: Control a cache unit 402 for accessing and storing a new sensing event of the EEPROM 550 of the sensor unit 500.

Step S675: Read by the memory control unit 400 the sensing event from the cache unit 420 according to the request of message sources.

Step S676: Generate a response message.

In summary, the claimed invention provides an advanced intelligent platform management interface (IPMI) system with multi-message processing and configurable performance and method for the same that have the following advantages:

(1) The claimed invention utilizes a central message buffer unit for temporarily storing an IPMI message. Only a pointer to a corresponding address of the IPMI message in transmitted between units, lowering memory usage and cost and reducing execution time, raising the overall performance of the IPMI system.

(2) The claimed invention utilizes a plurality of programmable-configured message processing units 302 easily pre-configured and installed by the user to concurrently multi-process the IPMI messages. It also presents most functions in sheet form so that a user predetermines needed parameters. And modularization of the procedures to execute the IPMI messages enhances the expandability and configurability of the system.

(3) The claimed invention utilizes a memory control unit for regularly polling an electrically erasable programmable read only memory (EEPROM) of a sensor unit, allowing the cache unit to access in advance a sensing event, store it, and quickly access the sensing event of the I$^2$C sensors.

(4) The claimed invention utilizes an operating system (OS) management module and a hardware management module for allowing the IPMI system to function with different OS and baseboard management controllers (BMC) and is capable of functioning in different hardware environments.

Those skilled in the art will readily observe that numerous modifications and alterations of the claimed device and method may be made while retaining the teachings of the invention. Accordingly, the above disclosure should be construed as limited only by the metes and bounds of the appended claims.

What is claimed is:

1. An advanced intelligent platform management interface (IPMI) system with multi-message and configurable performance, optimally used among message sources, the IPMI system comprising:

an IPMI message subsystem having a channel center used to receive/send an IPMI message from message sources, and having a message execution group which initiates a corresponding execution procedure with respect to each IPMI message;

an IPMI core subsystem having a plurality of application units at least one which executes the IPMI message according to the execution procedure of the IPMI message subsystem; and a central message buffer unit having a memory block which provides a pointer of a corresponding address in the block for temporary storage of each IPMI message wherein each said subsystem just transmits the pointer therebetween thereby reducing times of reading the IPMI message and raising the performance of the IPMI system, wherein the message execution group further comprises:

a plurality of message service modules which designates every IPMI message a default execution procedure correspondingly wherein at least one execution procedure instructs the application units of the IPMI core subsystem for executing said IPMI message;

a programmable-configured message sheet which allows the user to define the corresponding relation between every IPMI message and said message service module; and multiple message processing units, wherein each message processing unit looks up a corresponding message service module of the message sheet according to every IPMI message and initiates the execution procedure of the message service module.

2. The advanced IPMI system of claim 1 wherein the message execution group further programmably configures the multiple message processing units that concurrently multi-process the IPMI messages to enable the advanced IPMI system configurable execution performance.

3. The advanced IPMI system of claim 2 wherein the message processing units of the message execution group receive the pointers of the IPMI message and transmit the pointers to the application units of said IPMI core subsystem though the message service modules.

4. The advanced IPMI system of claim 3 wherein the application units of said IPMI core subsystem read and process the IPMI message from the central message buffer unit according to the pointer.

5. An advanced intelligent platform management interface (IPMI) system with multi-message and configurable performance, optimally used among message sources, the IPMI system comprising:

an IPMI message subsystem having a channel center used to receive/send an IPMI message from message sources, and having a message execution group which initiates a corresponding execution procedure with respect to each IPMI message;

an IPMI core subsystem having a plurality of application units at least one which executes the IPMI message according to the execution procedure of the IPMI message subsystem;

a central message buffer unit having a memory block which provides a pointer of a corresponding address in the block for temporary storage of each IPMI message wherein each said subsystem just transmits the pointer therebetween thereby reducing times of reading the IPMI message and raising the performance of the IPMI system; and a real time operating system (RTOS) management module having multiple specific mapping functions for communicating with different types of RTOS, allowing the advanced IPMI system to function with different RTOS.

6. The advanced IPMI system of claim 5 further comprising a hardware management module having a plurality of driver units for communicating with different baseboard management controllers (BMC), allowing the advanced IPMI system to function in different hardware environments.

* * * * *